Dec. 1, 1931.  G. L. R. J. MESSIER  1,834,857
RESILIENT WHEEL
Filed Nov. 2, 1929

INVENTOR
George Louis René Jean Messier
by
Attorney

Patented Dec. 1, 1931

1,834,857

UNITED STATES PATENT OFFICE

GEORGE LOUIS RENÉ JEAN MESSIER, OF MONTROUGE, FRANCE

RESILIENT WHEEL

Application filed November 2, 1929, Serial No. 404,302, and in France November 10, 1928.

The invention has for its object an improved wheel which is called resilient because, connected either to the fusilage of an aeroplane or to the frame of an automobile or other vehicle, it supports the load in a resilient manner, owing to its own construction and without any usual resilient suspension devices (springs, pneumatic suspension devices) interposed between the wheels and the said load.

The annexed drawings represents by way of example one method of carrying the invention into effect, in the case of a wheel attached resiliently to and intended for use upon aeroplanes, and in which the resilient part is a pneumatic cylinder called a landing cylinder.

Figure 1:
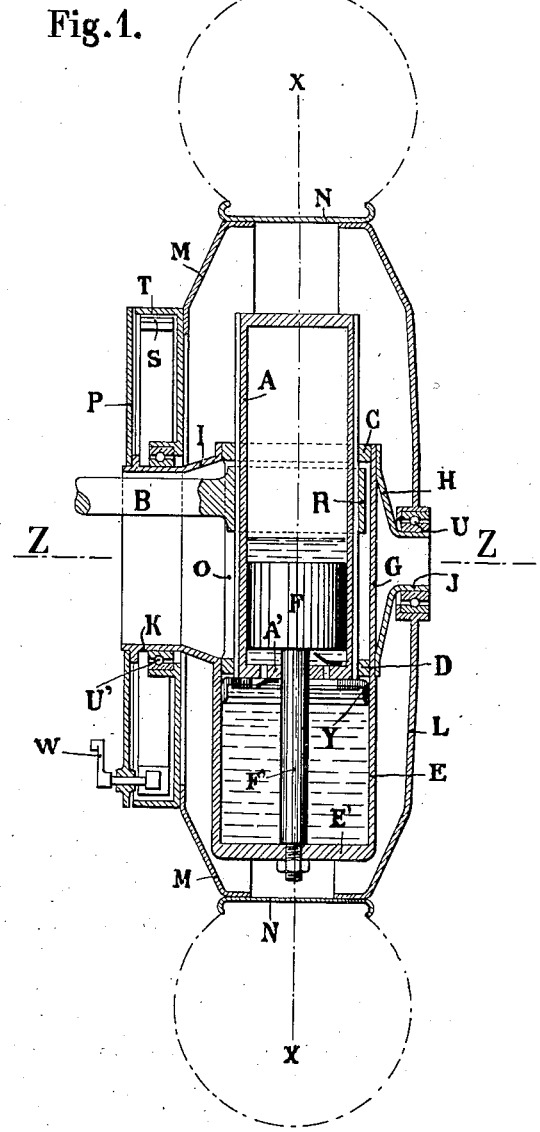
Fig. 1 is a diametrical section of the wheel taken through the axis of the landing cylinder.

The wheel is carried by an arm B which, in the example under consideration, is fixed to the fuselage of the aeroplane. In the application of the device to a vehicle, this arm would be fixed to the frame.

The arm B is itself fixed to a cylinder A referred to above as a landing cylinder, the connection being effected in any convenient manner, for example, by means of a collar R.

Upon the landing cylinder A there can slide with easy friction two rings C and D made, for instance, of bronze, connected together by a cylinder G. This latter is cut away at O upon the whole or part of its height in order to permit the passage and relative movement of the arm B.

The cylinder G is prolonged at its lower part by a cylinder E upon the lower part E' of which is attached the rod F' of the piston F movable in the landing cylinder A.

The cylinder G has two lateral bosses H and I which are prolonged by the hollow cylindrical trunnions marked respectively J and K.

Upon these trunnions are mounted the bearings of the wheel.

These bearings may be constituted simply by means of two rings.

In the example shown on the drawings there has been provided ball bearings U, U', the external rings of which are fixed respectively to the walls or cheeks L and M constituting with the rim N the wheel body.

The cheek M carries a brake drum T in the interior of which the segments S can act applied by any suitable means, hydraulic, mechanical, or otherwise.

A plate P fixed to the trunnion K carries the axles of these segments and allows the lever W to pass therethrough, said lever carrying the control cam. The drum T and the plate P may be placed in the interior of the cheek M instead of being outside the same as in the example shown in the drawings.

It will be seen after the above statement, that the resilient wheel, made according to the invention, is constituted by a fixed carriage A and B (fixed to the fuselage or to the frame) upon which may reciprocate up and down a movable carriage G—H—I terminated by the trunnions J—K upon which rotates the body L, M, N of the wheel.

The movable carriage is guided and retained in proper vertical position upon the fixed carriage by means of a pair of spaced guide rings C—D, which are spaced a sufficient distance apart to eliminate any tendency to binding, the guide rings therefor being very efficacious in preventing the wheel from leaning laterally, whatever may be the angle under which it comes into contact with the ground. This method of guiding is an essential characteristic of the invention.

Figure 2:
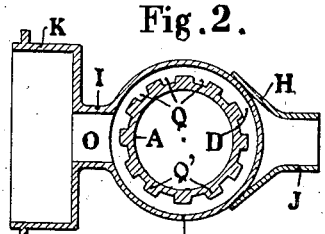
Fig. 2 is a section taken perpendicularly with respect to the section taken in Fig. 1 and on the line Z—Z.

To prevent the wheel pivoting around the axis X—X of the cylinder A there is provided a device such as grooves or keys which allow axial movement of the cylinder G but prevent the rotation of this latter. In the example (see particularly Fig. 2) this device is constituted by a series of teeth Q cut upon the whole or part of the circumference of the rings C and D these teeth being in engagement with the corresponding ribs Q' upon the cylinder A. When the apparatus is applied to a motor vehicle, these devices, preventing the rotation around the axis X—X are naturally suppressed in the case of the front wheels. In this case, the steering lever may be, for example, fixed to the trunnion K.

In the example shown, the wheel obtains its resiliency from the pneumatic apparatus A—E—F. This latter may be similar to that which formed the object of United States application, filed by the same applicant on June 13, 1929 under Serial No. 370,622. More particularly, the lower part A' of the cylinder A may be provided with a cup leather Y and openings may be provided in the parts A' and Y with valves conveniently arranged so as to effect a pneumatic apparatus in conformity with the above mentioned patent.

It will be understood that the any other resilient device, such as sandows, elastic cords, springs, etc., may be substituted for the pneumatic device A—E—F without departing by so doing from the ambit of the invention, whilst retaining, naturally, as guiding devices the cylinder A and the combined device C—D—G.

The invention may be further carried into effect in various modified forms: one of these, for example, consists in forming the bosses H and I with equal diameters so as to permit the prolongation of the arm B on the other side of the axis of the cylinder A.

The apparatus will then become symmetrical and will possess the advantage of permitting either the ready fixing of stays or mounting the wheel in a fork, or combining these two methods of mounting.

I claim:—

In a wheel for aeroplanes, automobiles and other vehicles, the combination of a cylinder rigidly connected to the vehicle body, a movable cylinder guided by the first cylinder, a guiding device including spaced groups of guiding teeth fixed at the ends of the second cylinder and slidably engaging the first cylinder, trunnions fixed to the second cylinder, a wheel body comprising two opposite cheeks rotatably mounted on said trunnions and a rim connecting said cheeks, resilient means connecting the movable cylinder to the rigid cylinder, and longitudinal ribs provided on the periphery of said rigid cylinder, in engagement with the afore-said teeth of the guiding device.

The foregoing specification of my "improved resilient wheel" signed by me this 21st day of October 1929.

GEORGE LOUIS RENÉ JEAN MESSIER.